United States Patent [19]

Bates et al.

[11] Patent Number: 5,793,370

[45] Date of Patent: Aug. 11, 1998

[54] DISPLAY APPARATUS FOR TOSSING WINDOWS

[75] Inventors: Cary Lee Bates; Edwin Ernest Burris, both of Rochester; Jeffrey Michael Ryan, Byron, all of Minn.

[73] Assignee: International Business Machines Corporation, Armonk, N.Y.

[21] Appl. No.: 834,972

[22] Filed: Apr. 7, 1997

Related U.S. Application Data

[62] Division of Ser. No. 357,628, Dec. 16, 1994.

[51] Int. Cl.[6] .......................................................... G06F 3/00
[52] U.S. Cl. .......................................................... 345/342
[58] Field of Search .................................... 345/326–358

[56] References Cited

U.S. PATENT DOCUMENTS

| | | | |
|---|---|---|---|
| 4,734,685 | 3/1988 | Watanabe | 340/710 |
| 5,146,556 | 9/1992 | Hullot et al. | 345/339 |
| 5,166,666 | 11/1992 | Tanaka | 340/706 |
| 5,195,179 | 3/1993 | Tokunaga | 395/161 |
| 5,301,336 | 4/1994 | Kodosky et al. | 395/800 |
| 5,305,435 | 4/1994 | Bronson | 395/159 |
| 5,390,295 | 2/1995 | Bates et al. | 395/157 |
| 5,497,454 | 3/1996 | Bates et al. | 395/158 |

*Primary Examiner*—John E. Breene
*Attorney, Agent, or Firm*—Owen J. Gamon

[57] ABSTRACT

A display apparatus and method that provides a windowing interface that gives the user the capability to toss a window on a display screen by selecting a window by engaging the pointing device, moving the window by moving the pointing device and tossing the window by disengaging the pointing device, whereby the window continues to move after the user has disengaged the pointing device. A portion of the window is optionally kept on the screen so that the window is not tossed completely off of the screen.

7 Claims, 10 Drawing Sheets

Tossable Windows Options

Friction

X: .5

Y: .3

Percentage to stay on screen: 50%

DISPLAY APPARATUS FOR TOSSING WINDOWS

This is a divisional of co-pending application Ser. No. 08/357,628 filed on Dec. 16, 1994.

FIELD OF THE INVENTION

This invention relates to the data processing field. More specifically, this invention relates to tossing a window on a display screen.

BACKGROUND OF THE INVENTION

Early computer systems were controlled by batch operating systems. These systems had limited interaction with users of the system. An operator had to load the job to be run and send the output to a printer. With the advent of time sharing operating systems, such as the IBM System 370, interactive computing became the norm. Time sharing operating systems allowed many users to use the computer's resources simultaneously, so that all users of the system appeared to have their own computer system. All users had their own terminal, which was connected to the central computer system. This terminal typically consisted of a display and a keyboard. To the user, this terminal appeared to be an interactive computer system in its own right.

With the advent of computer systems that allowed truly interactive computer applications came a proliferation of user interfaces. Some of these interfaces were command driven, others where menu driven, but they all only allowed the user to work on only one task or application from a given terminal at a time.

Today, the state of the art for computer systems and user interfaces has advanced beyond the single task interface. Inexpensive personal computers and workstations with powerful graphics processors and multi-tasking operating systems such as IBM Operating System/2 have changed the way users interact with computer systems. With these operating systems the user can simultaneously work on many tasks at once, each task being confined to its own display panel, called a window. This interface allows the presentation of multiple windows in potentially overlapping relationships on a display screen. The user can thus retain a window on the screen, while temporarily superimposing a further window entirely or partially overlapping the retained window. This enables users to divert their attention from a first window to one or more secondary windows for assistance and/or reference, so that overall user interaction may be improved. The processor which controls this operation must retain the information relating to the original window and any subsequent overlaid windows. There may be many windows with active applications running at once. As the number of open windows becomes large and the screen becomes cluttered, it becomes more and more difficult for the user to find the desired window with which to work because the desired window may be overlaid by several other windows.

In order to find the desired window, current systems allow the user to reduce overlying windows to icons (symbols that represent the windows) by clicking the mouse button while the mouse cursor is positioned on a minimize button. This method suffers from the disadvantage that when the window is reduced to an icon, the user cannot see the window contents. Many times when an application in a window is running, the user might wish to see the window contents. By seeing all or a portion of the window contents, the user has a better chance of determining when the application is complete or needs attention. For example, a compiler, system backup operation, or terminal emulator may be left running in one window while the user is interacting with an application in another window. It is also advantageous to have part of the window visible for identification purposes.

Another method of finding the desired window is to grab overlying windows and drag them to the side or partially off the screen. Dragging takes too much of the user's time and diverts the user's attention from the primary work inside the desired window in which the user is interested.

For the foregoing reasons, there is a need for a windowing interface that permits the user to remove overlying windows from the desired window quickly and easily while still keeping visible a portion of the overlying windows.

SUMMARY OF THE INVENTION

It is an object of the present invention to provide an enhanced windowing system.

It is a further object of this invention to provide a method and apparatus for tossing a window.

It is a further object of this invention to provide a method and apparatus for tossing a window while keeping a portion of the window on the screen.

It is a further object of this invention to provide a method and apparatus for tossing a window where the rate of movement of the tossed window slows over time due to friction components.

These and other objects are achieved by the computer system providing a windowing interface that gives the user the capability to toss a window on a display screen by selecting a window by engaging the pointing device, moving the window by moving the pointing device and tossing the window by disengaging the pointing device, whereby the window continues to move after the user has disengaged the pointing device. A portion of the window is optionally kept on the screen so that the window is not tossed completely off of the screen.

DETAILED DESCRIPTION OF PREFERRED EMBODIMENT

Figure 1A:
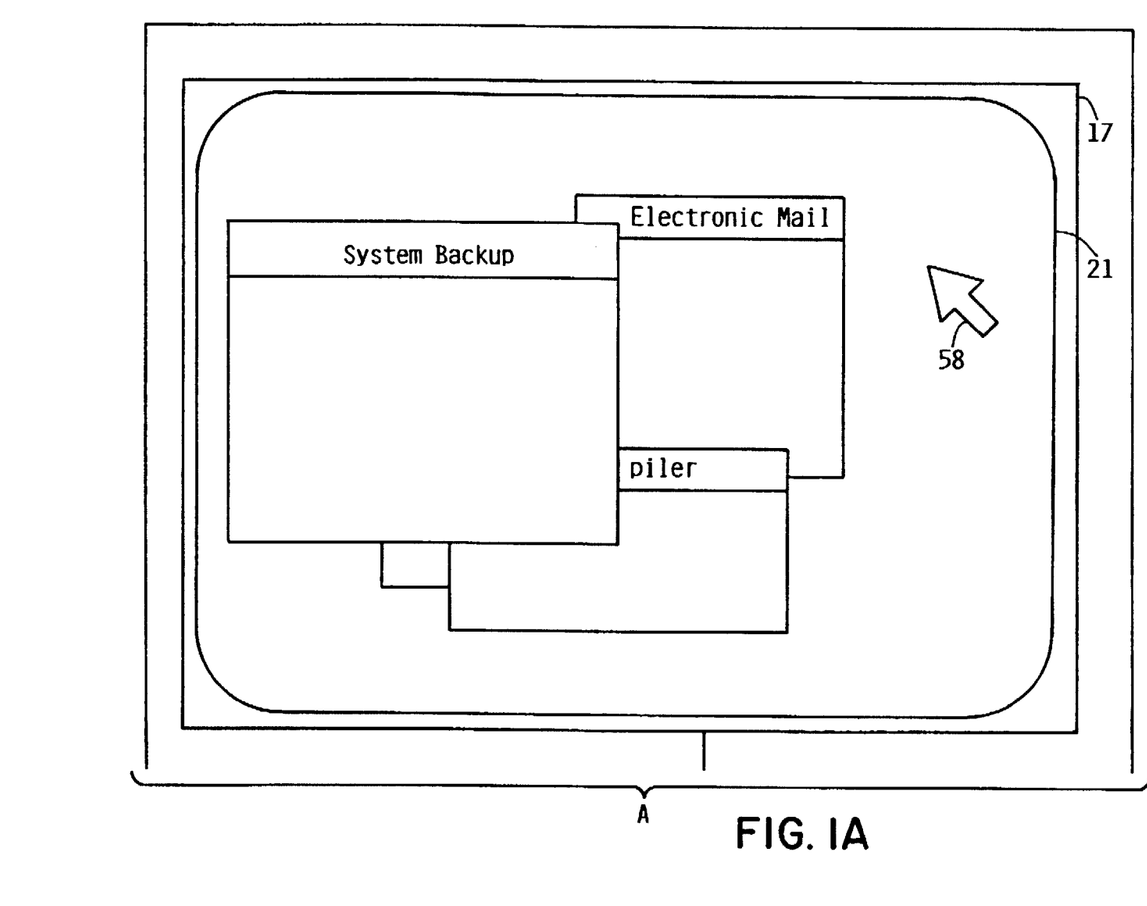
FIG. 1 shows a block diagram of the computer system of the preferred embodiment.
Figure 1B:
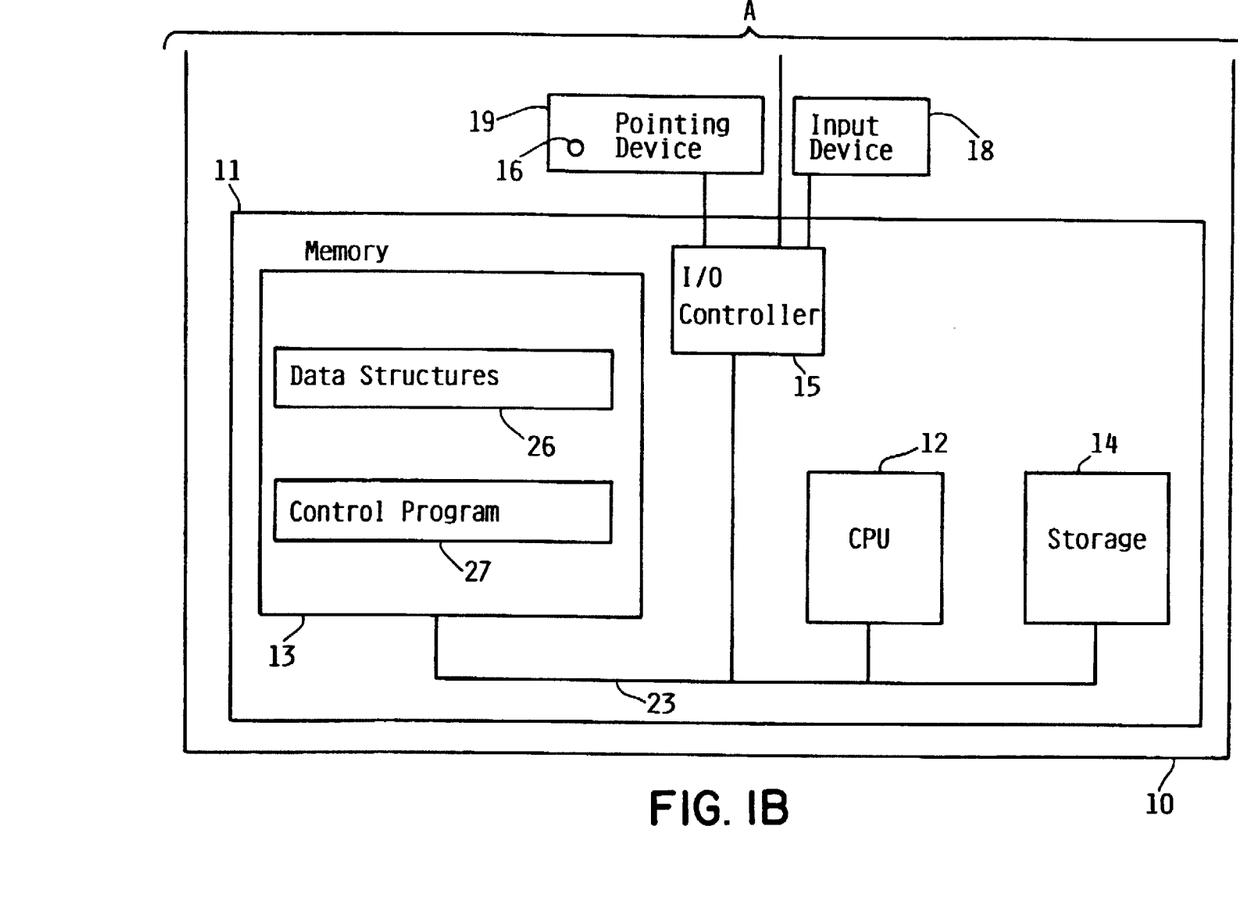

FIG. 1 shows a block diagram of computer system 10 of the preferred embodiment of the invention. Computer system 10 has display 17, input device 18, and pointing device 19, each of which is connected to system unit 11. Display 17 contains screen 21. In the preferred embodiment, input device 18 is a keyboard, but it could be any device capable of sending data or characters to an application in a window, including a speech recognition device. In the preferred embodiment, pointing device 19 is a mouse containing button 16, but it could be any other pointing device capable of moving windows on screen 21, such as a joystick, trackball, light pen, infra-red hand held control device, or a speech recognition device. In the preferred embodiment, input device 18 and pointing device 19 are separate, but they could be the same device, or pointing device 19 could be mounted on input device 18 as in a keyboard that has a built in trackball. System unit 11 contains central processor unit (CPU) 12 connected via bus 23 to memory 13, storage 14, and I/O controller 15. In this example display 17, input device 18, and pointing device 19 are all connected to I/O controller 15, but each could have its own controller. Pointer 58 displayed on screen 21 is controlled by pointing device 19 and can be used to manipulate objects on screen 21. In this example, pointer 58 is an arrow, but it could be any symbol meaningful to the user.

In the preferred embodiment, CPU 12 is a general purpose programmable processor such as an Intel 80486 processor commonly used in personal computers. Memory 13 is a random access memory sufficiently large to hold the necessary programming and data structures. While memory 13 is shown as a single entity, it should be understood that memory 13 may in fact comprise a plurality of modules, and that memory may exist at multiple levels, from high-speed registers and caches to lower speed but larger DRAM chips. Memory 13 contains data structures 26 and control program 27. Data structures 26 are the primary data structures of the preferred embodiment and will be explained in more detail under the description for FIGS. 6 and 7. Control program 27 comprises a plurality of machine instructions that execute on CPU 12 to carry out this invention as described in more detail in the flowcharts of FIGS. 6 and 7. The contents of memory 13 can be loaded and stored from and to storage 14 as needed. In the preferred embodiment, storage 14 is DASD (Direct Access Storage Device). While storage 14 is drawn as a single entity, it should be understood that storage 14 may in fact comprise a plurality of storage devices.

In the preferred embodiment, computer system 10 is an IBM PS/2 and display 17 is an IBM 8516 display. Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 could be a microcomputer such as described above but connected to a larger computer system such as an IBM AS/400.

Figure 2:
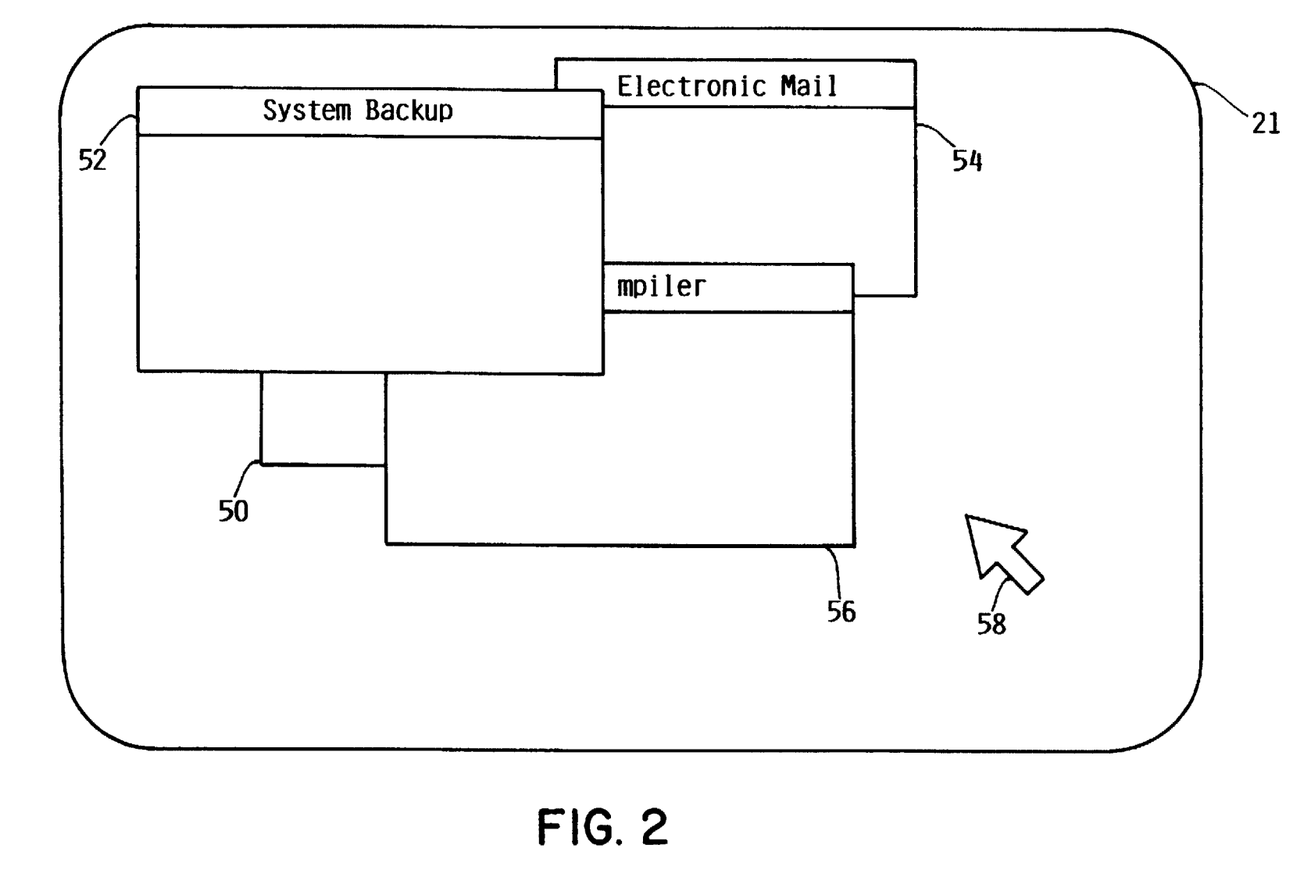
FIGS. 2 and 3 show an example of windows before and after being tossed out of the way.

FIG. 2 shows an example where the user's desired window, word processor 50, is underneath multiple other open windows, represented by system backup window 52, electronic mail window 54 and compiler window 56.

Figure 3:
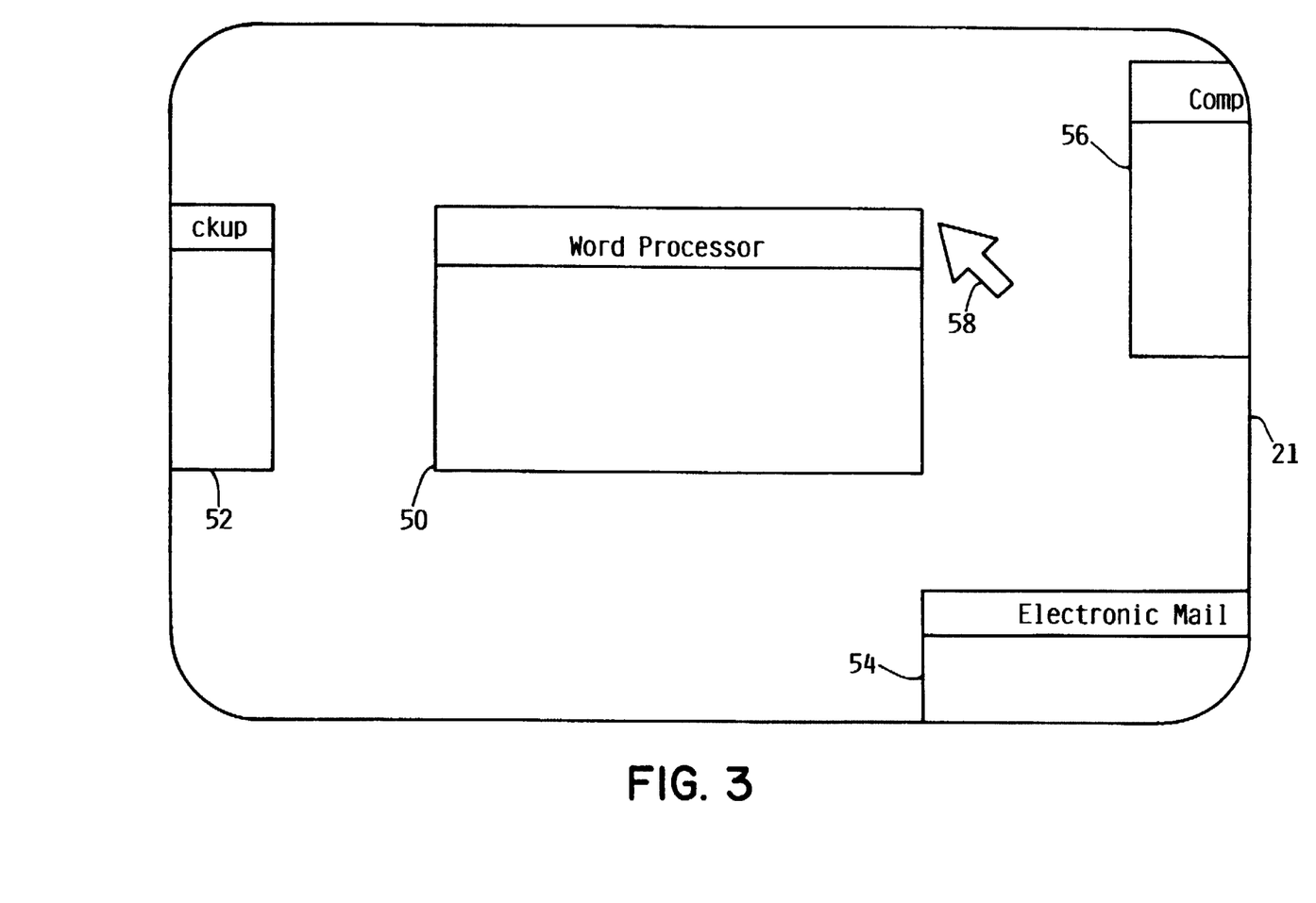

FIG. 3 shows the appearance of screen 21 after the user used pointing device 19 to toss system backup window 52 to the left, compiler window 56 up and to the right, and electronic mail window 54 down and to the right.

Tossing a window is implemented by the user first performing a window move, which is accomplished by the user selecting the window to be moved by engaging pointing device 19 within the title bar of the window and then moving pointing device 19. In the preferred embodiment the user positions the pointer associated with the pointing device 19 within the title bar of the window, depresses button 16, and then moves pointing device 19. While the window is being moved, a stream of move events are sent to control program 27 and each of these move events prompts control program 27 to redraw the window at the position of the move event if the new event has a position different from the past event. When the user disengages pointing device 19 (in the preferred embodiment by releasing button 16), control program 27 uses the last two move events to determine how fast the window was moving when released and therefore how far to toss the window.

Figure 4:
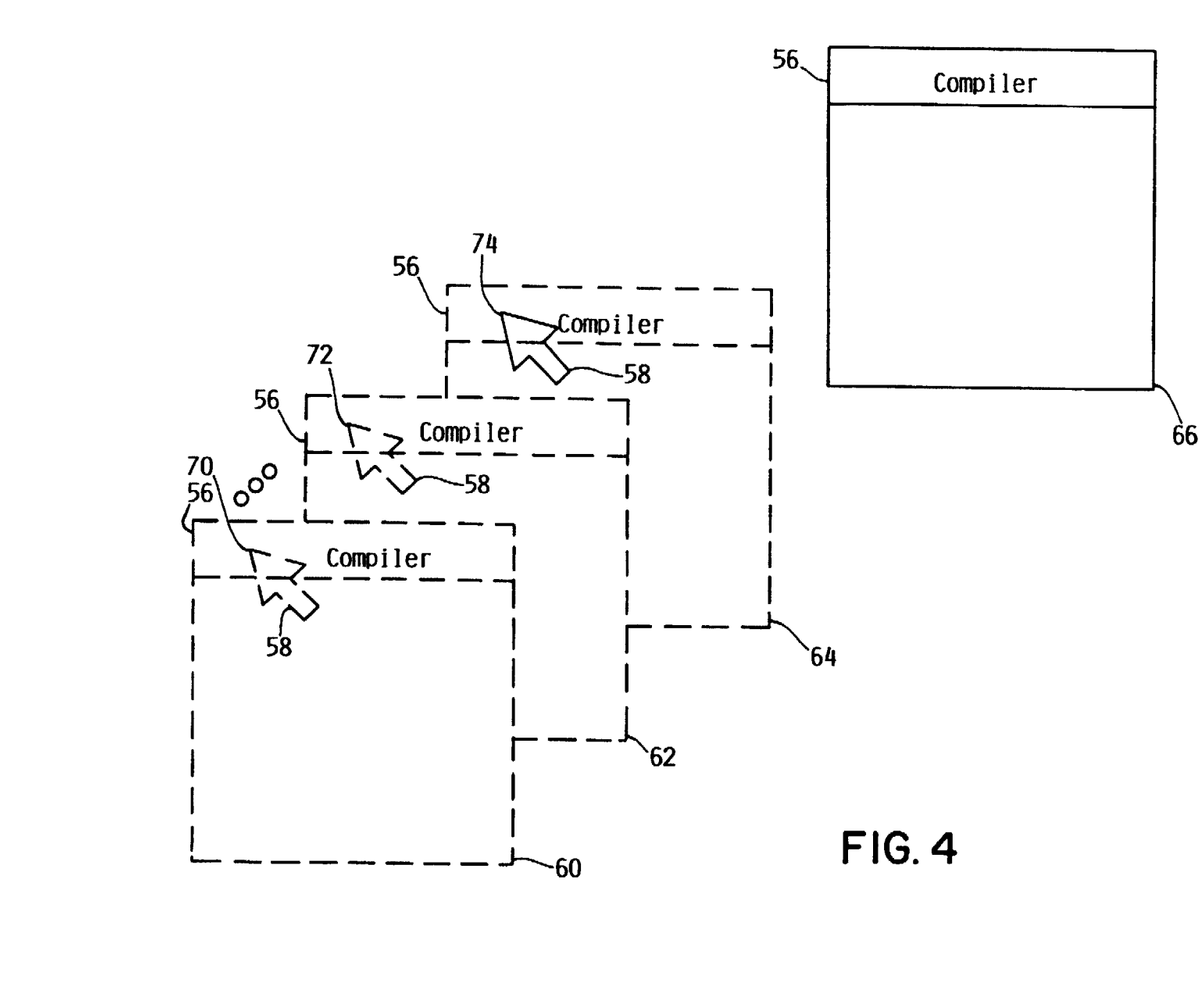
FIG. 4 shows an example of pointing icon and a window in various positions as the pointing icon is used to toss the window.

An example of tossing window 56 from window position 60 to window position 66 using the present invention is shown in FIG. 4. Window 56 initially exists at window position 60. The user positions pointer 58 using pointing device 19 at pointer position 70, in the window title bar of window 56, and depresses button 16. While continuing to hold button 16, the user moves pointer 58 in the direction that the user wishes to move window 56, in this example up and to the right. Each of pointer positions 70 through 74 generates a move event, which causes window 56 to be redrawn at window positions 60 through 64. Pointer position 72 is the next to the last pointer position, which generates the next to the last move event. Pointer position 74 is the last pointer position and is the pointer position at which the user releases button 16, which generates a button up event. Control program 27 looks at the last two of these events (window position 62 and 64) as well as the difference in the time associated with the last two move events to determine how fast the window was moving when released and therefore how far to toss the window. This tossing mechanism is described in the flowcharts of FIGS. 6 and 7. In this example, after the user has released button 16 at pointer position 74, window 56 continues to travel from window position 64 to window position 66.

Figure 5:
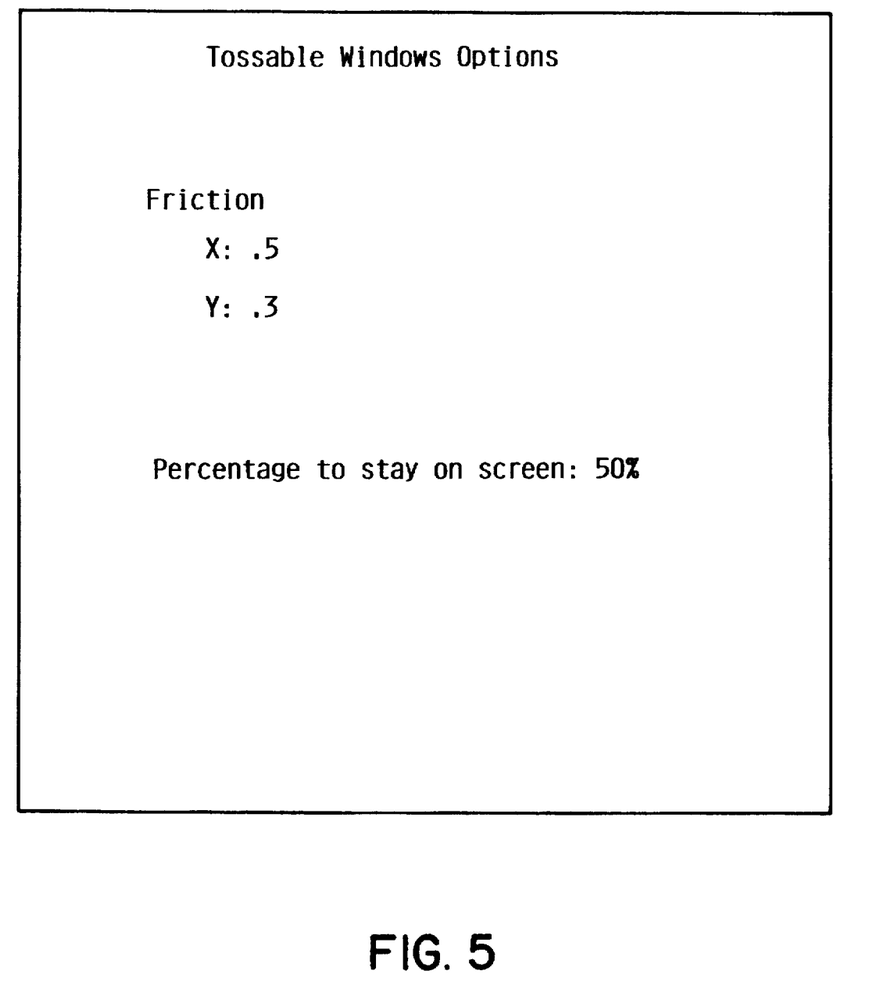
FIG. 5 shows an example of a Tossable Windows option screen.

FIG. 5 shows an example of a Tossable Windows option screen. Friction is the amount to reduce the window movement as it is tossed, so that the window movement slows gradually. Friction is expressed in pixels. Friction has both an x and y component because the pixels may not be perfectly square, so the x and y component are allowed to be different so that the window will not curve as it is tossed. Percentage to say on screen is the percentage of the window that is not allowed to slide off the screen. This prevents the window from being tossed entirely off the screen. Although this example shows the user inputting the friction and percentage to stay on screen, the system could use default values or could tailor the friction component values to the type of display screen attached to the computer system.

Figure 6A:
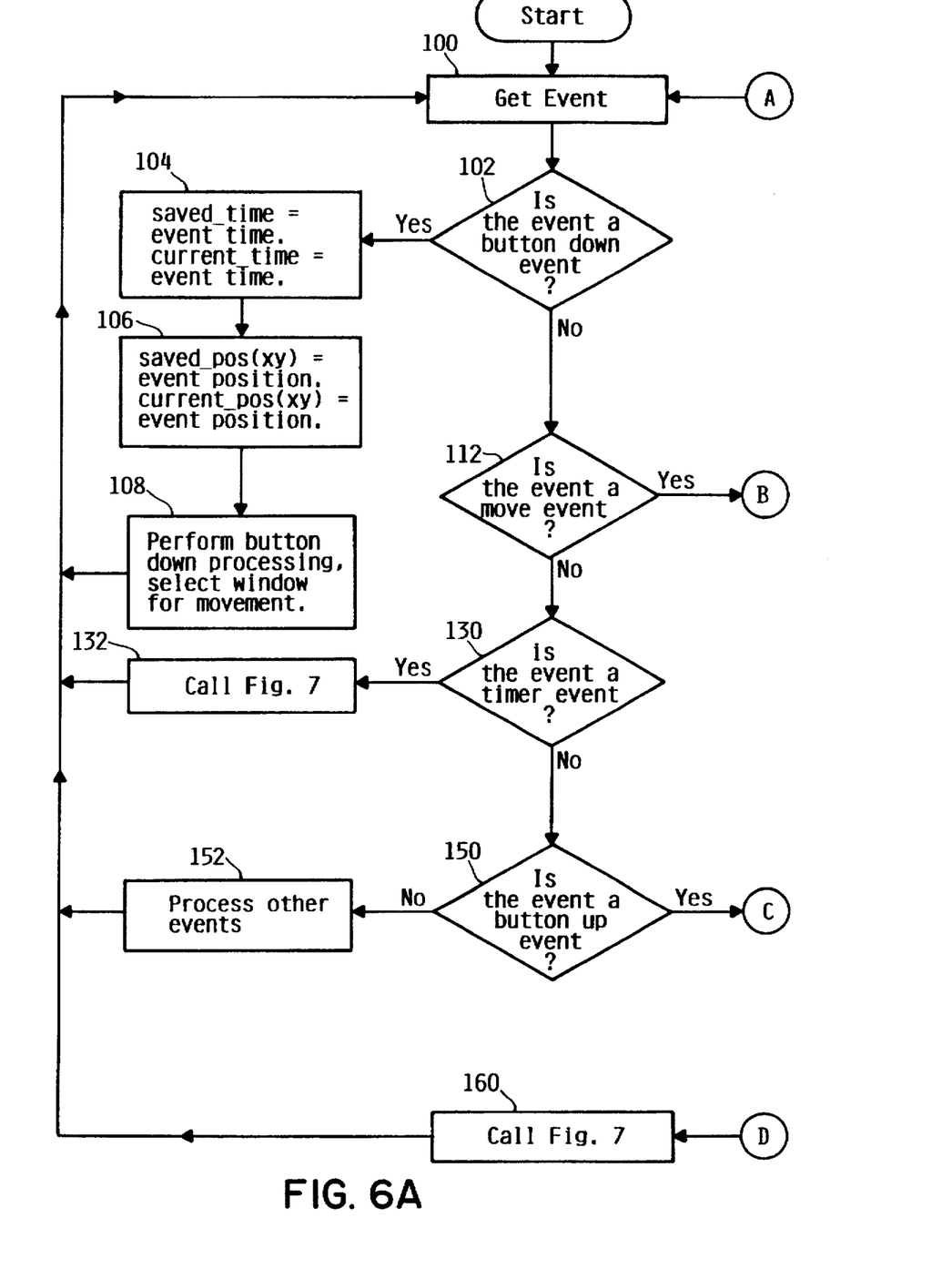
FIGS. 6A–B and 7A–B show the flowcharts that describe the operation of the preferred embodiment.
Figure 6B:
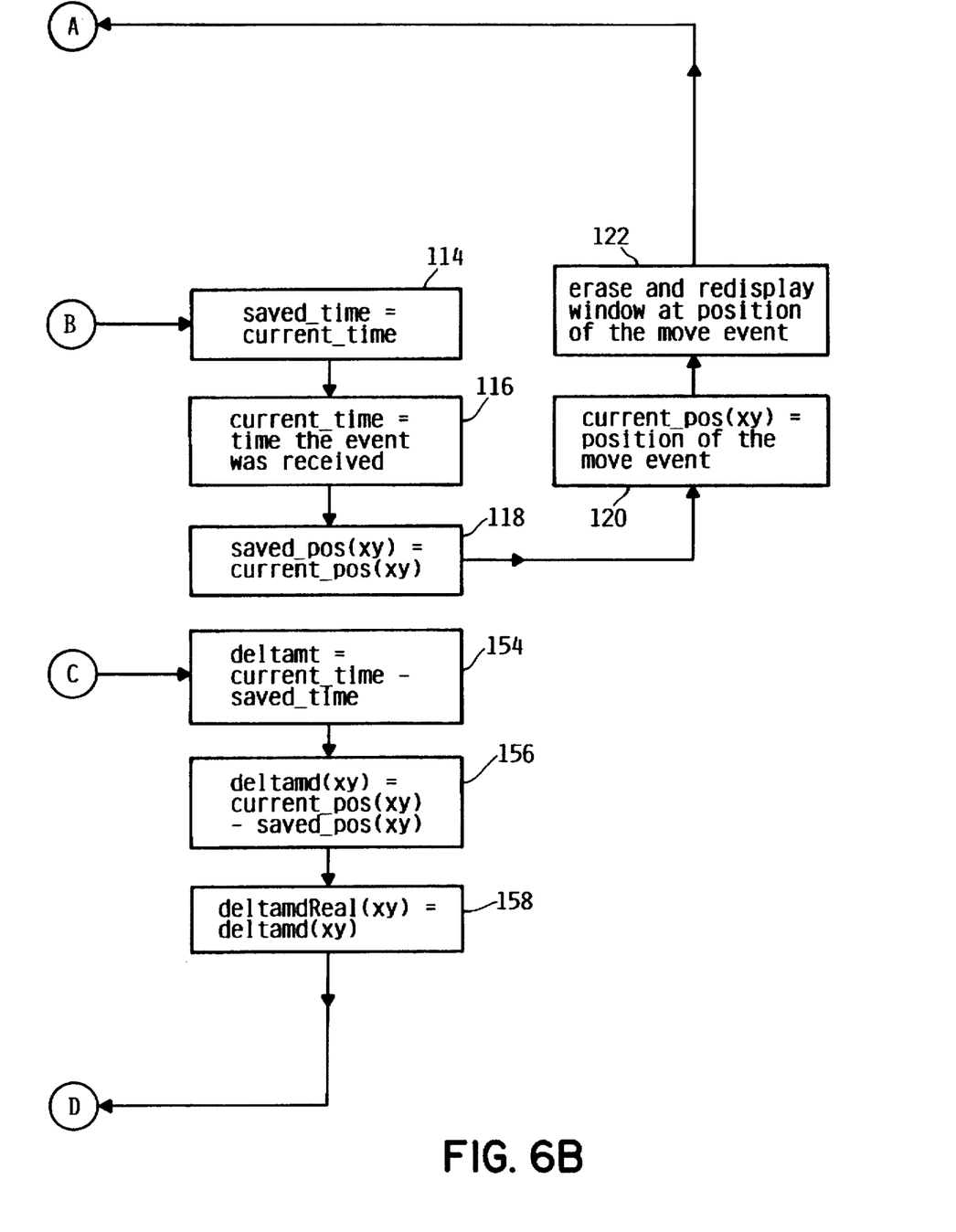
Figure 7A:
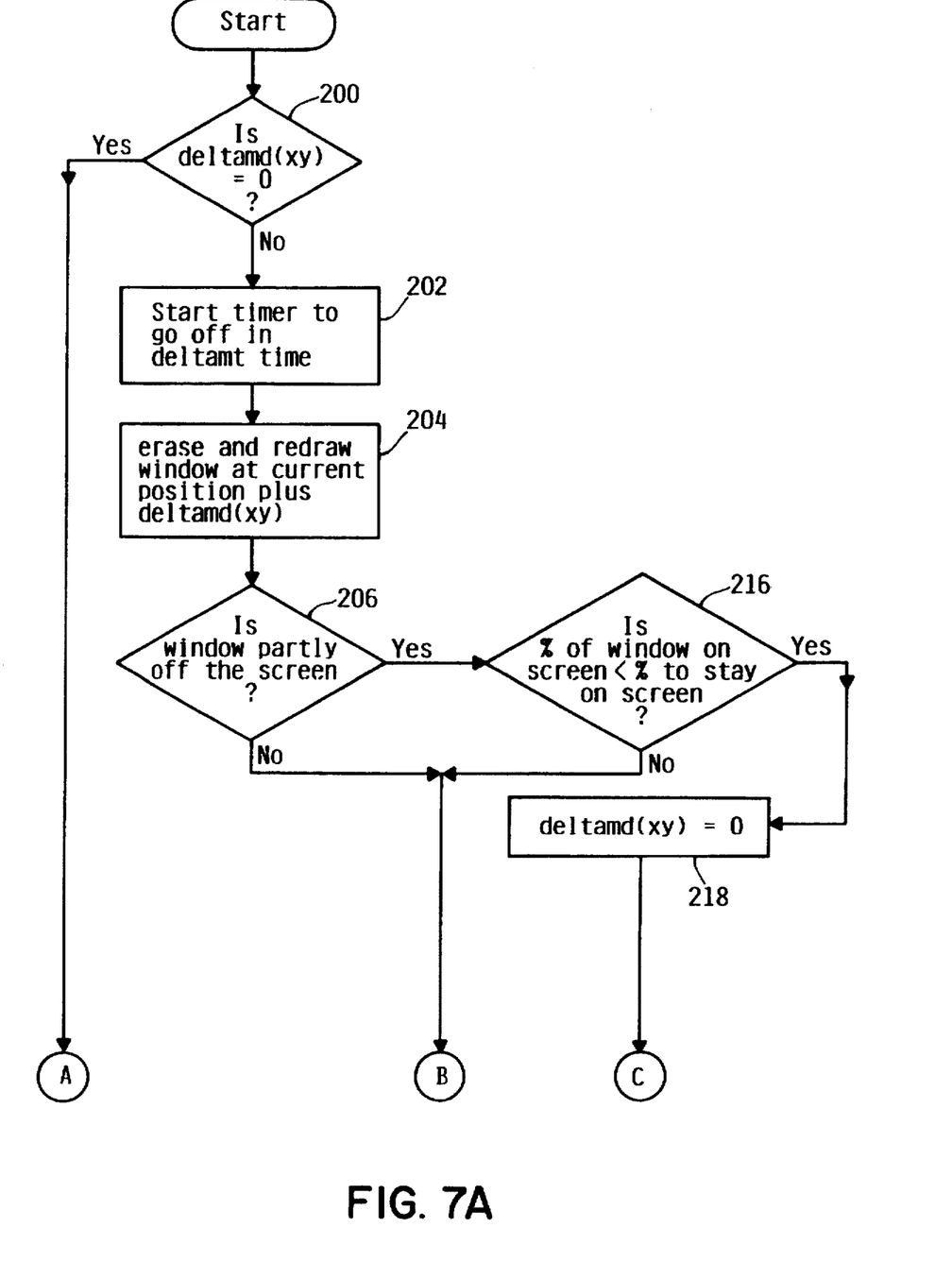
Figure 7B:
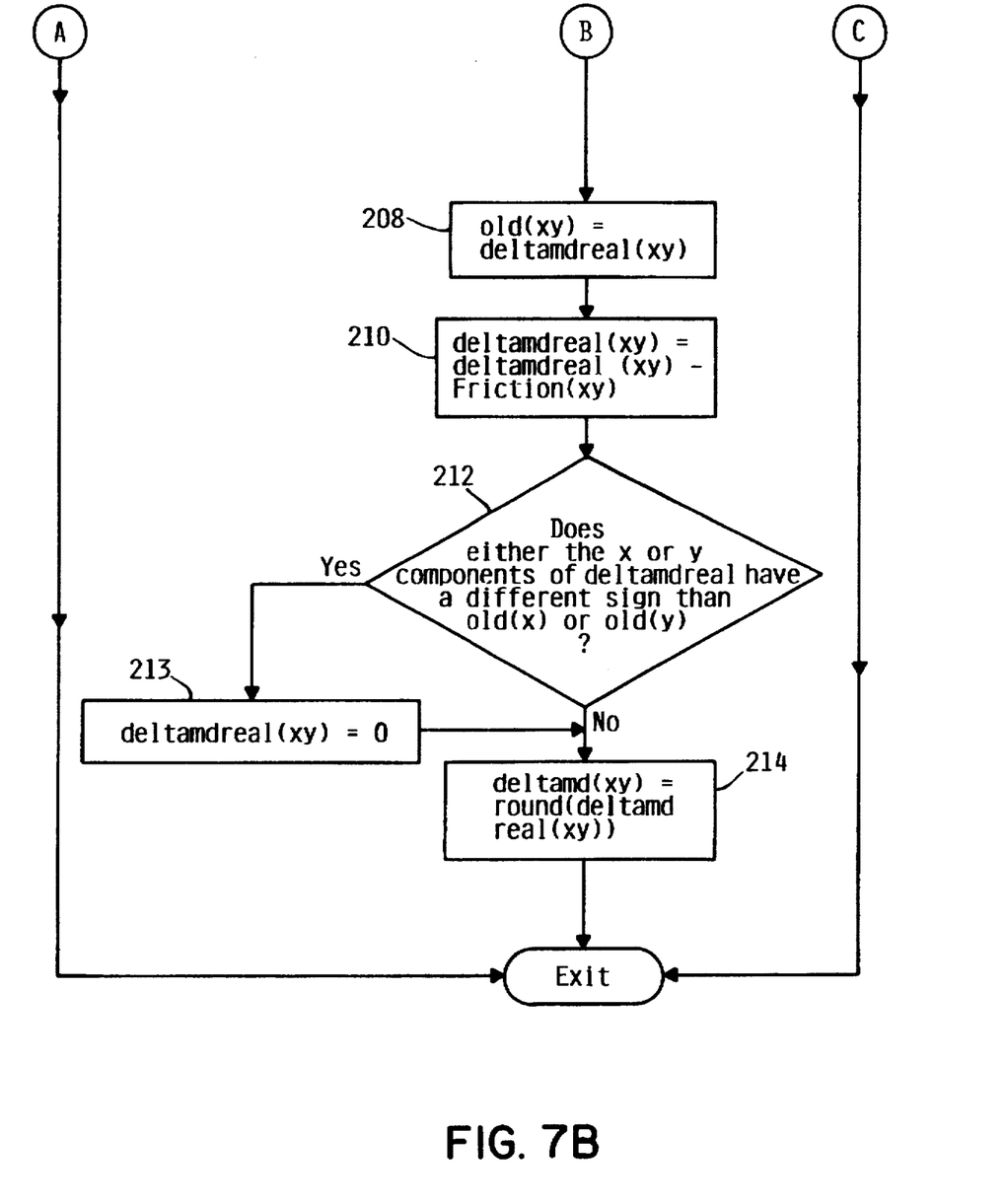

The operation of the preferred embodiment, as shown in the flowcharts of FIGS. 6-7 will now be described in more detail.

FIG. 6 shows a flow chart for the window manager event processing routine of computer system 10 that handles events from pointing device 18. An event is the basic form of communication that a window manager uses. FIG. 6 shows the processing associated with three events: button down events, window move events, and button up events. All events are received by control program 27 at block 100.

A button down event will occur in the preferred embodiment in response to the user depressing button 16 on pointing device 19, or otherwise engaging pointing device 19, while pointer 58 is within the title bar of the window that the user wishes to move. Control program 27 determines that the event received at block 100 is a button down event at block 102. Control program 27 initializes both saved_time and current_time to the time that the button down event occurred at block 104, and initializes both saved_pos(x,y) and current_pos(x,y) to the position on the screen associated with the button down event at block 106. In the preferred embodiment, positions on screen 21 are defined on an (x,y) Cartesian coordinate system with "x" representing the horizontal axis and "y" representing the vertical axis and location (0,0) representing the lower left hand corner of screen 21. However, other methods of defining locations on screen 21 could be used without departing from the invention. Control program 27 then performs the normal processing for a button down event, including selecting the window for movement, in block 108 before returning to block 100 to get the next event.

A window move event will occur in the preferred embodiment in response to the user moving pointing device 19 after selecting the desired window by engaging button 16 on pointing device 19 while pointer 58 is in the title bar of the desired window. Control program 27 determines that the event received at block 100 is a window move event at block 112 after having taken the "no" branch of block 102. Control program 27 at block 114 sets saved_time to be current_time. At block 116, control program 27 sets current_time to be the time that the window move event was received. At block 118, control program 27 sets saved_position(x,y) to be current_position(x,y). At block 120, control program 27 sets current_position(x,y) to be the position of the window move event. At block 122, control program 27 erases the window displayed at saved_position(x,y) and redisplays it at the position where the event was received. Control program 27 now returns to block 100 for the next event. Thus, the combination of the execution of blocks 112–122 by control program 27 causes current_position(x,y) and saved_position(x,y) to contain the last two positions of pointing device 18; similarly, current_time and saved_time contain the corresponding last two times, and the selected window is moved in response to the movement of pointing device 19 by the user.

A button up event will occur in the preferred embodiment when the user releases button 16 on pointing device 19. If a button up event occurred, after the "no" branches of block 102, 112, and block 130 are taken and the "yes" branch of block 150 is taken, control program 27 at block 154 calculates deltamt, by subtracting saved_time from current_time. Deltamt thus represents the time duration between the last two move events prior to the button up event, and it includes the time to erase and redraw the window. At block 156, control program 27 calculates deltamd(x,y) by subtracting saved_pos(x,y) from current_pos(x,y). Deltamd(x,y) thus represents the distance between the positions of the last two move events prior to the button up event and is an integer value. At block 158, control program 27 initializes deltamdreal(x,y) to be deltamd(x,y). DeltamdReal(x,y) is real (floating point) value for the distance to reduce movement by and will be used in calculations described under the description for FIG. 7, below.

At block 160, control program 27 calls the flow represented by FIG. 7, which handles the tossing of the window after the button up event. Referring to FIG. 7, control program checks to see if deltamd(x,y) is zero at block 200. Deltamd(x,y) will be zero when either: 1) there were both button down and button up events with no intervening move event; 2) deltamd(x,y) was set to zero by block 218, which means the window was tossed off the screen too much; or 3) friction has reduced the tossing movement to zero at block 213. If deltamd(x,y) is zero, then control program 27 exits.

If deltamd(x,y) is not zero, then control program 27 at block 202 starts a timer set to go off in deltamt time. Deltamt represents the time between the last two times that the window was redrawn. When deltamt was set originally by control program 27 at block 154, it included the time to erase and redraw the window, so the erase and redraw time is already accounted for. Deltamt is used for the timer period so that there will be a smooth transition in window motion from the manual movement performed by the user to the automatic motion performed by the tossing mechanism.

When the timer expires, a timer event will be received by control program 27 at block 100 of FIG. 6 and will be handled as described below under the description for blocks 130 and 132. After starting the timer at block 202, control program 27 continues to block 204 where it erases the window at current position and redraws the window at current position plus deltamd(xy). If the window is partly off the screen at block 206 and the percentage of the window still on the screen is less than the percentage that is to remain on the screen (described in FIG. 5), then the window is done being tossed, so deltamd(xy) is set to zero by control program 27 at block 218, and control program 27 exits FIG. 7.

If the window is not partly off the screen at block 206 or the percentage of the window remaining on the screen is greater than or equal to the desired percentage at block 216, then control program 27 sets old(xy) to be deltamdreal(xy) at block 208 and subtracts the friction component from deltamdreal(xy) at block 210. Friction is described above under the description for FIG. 5. If either the x or y components of deltamdreal have a different sign than that of old(x) or old(y) at block 212, then control program 27 sets deltamdreal(xy) to be zero at block 213. This will occur when friction has slowed the tossed window to a stop. At block 214, control program 27 sets deltamd(xy) to be the rounded value of deltamdreal(xy). The value is rounded to an integer value because a pixel is the smallest unit on the screen that a window can be moved. After block 214, control program 27 exits FIG. 7 and returns to FIG. 6 at either block 132 or block 160.

Referring back to FIG. 6, a timer event will be received at block 100 when the timer that was started by block 202 in FIG. 7 expires. Control program 27 will take the "no" branch of blocks 102 and 112 and the "yes" branch of block 130 and invoke FIG. 7 at block 132.

If the event received at block 100 is not a button down event, a move event, or a timer event, or a button up event, then the event received is processed by control program 27 at block 152 before returning to block 100 to get the next event.

While this invention has been described with respect to the preferred and alternative embodiments, it will be understood by those skilled in the art that various changes in detail may be made therein without departing from the spirit, scope, and teaching of the invention. For example, the type of applications that use windows may change from what is known today. In addition, windowing technology may become widely employed in consumer applications such as operator panels for consumer electronics, appliances, and automobiles. Accordingly, the herein disclosed invention is to be limited only as specified in the following claims.

What is claimed is:

1. An article of manufacture for moving a window on a screen using a pointing device, comprising:

storage;

displaying means, recorded on the storage, for displaying a window on the screen;

moving means, recorded on the storage, for moving the window in response to a user engaging and moving the pointing device; and tossing means, recorded on the storage, for continuing to move the window after the user has disengaged the pointing device.

2. The article of manufacture of claim 1, wherein the tossing means moves the window by erasing and redisplaying the window at a plurality of locations on the screen.

3. The article of manufacture of claim 2, wherein the tossing means further comprises friction means for slowing movement rate of the window until the window has stopped moving.

4. The article of manufacture of claim 2, wherein the tossing means further comprises stopping means for stopping movement of the window when the window reaches a predetermined percent remaining on the screen.

5. The article of manufacture of claim 4, wherein the predetermined percent is determined by the user.

6. The article of manufacture of claim 1, wherein the moving means further comprises means for generating a stream of move events corresponding to positions of the window as the window is moved by the user via the pointing device.

7. The article of manufacture of claim 3 wherein the screen has a horizontal and a vertical axis and the friction means further comprises both a horizontal and vertical component corresponding to the horizontal and the vertical axis.

* * * * *